United States Patent [19]

Walchhutter

[11] Patent Number: 5,556,266
[45] Date of Patent: Sep. 17, 1996

[54] DEVICE FOR FEEDING PRESSURIZED LIQUID TO A HYDRAULIC CIRCUIT

[75] Inventor: Ulrico Walchhutter, Milan, Italy

[73] Assignee: S.I.T.I. Societa Impianti Termoelecttrici Industriali, Marano Ticino, Italy

[21] Appl. No.: 162,099

[22] PCT Filed: Jun. 2, 1992

[86] PCT No.: PCT/EP92/01224

§ 371 Date: Dec. 10, 1993

§ 102(e) Date: Dec. 10, 1993

[87] PCT Pub. No.: WO92/22747

PCT Pub. Date: Dec. 23, 1992

[30] Foreign Application Priority Data

Jun. 11, 1991 [IT] Italy ................................ MI91A1610

[51] Int. Cl.⁶ ....................................................... F04B 17/00
[52] U.S. Cl. .............................................. 417/362; 74/572
[58] Field of Search ...................................... 417/362, 361, 417/350; 74/572, 665 G, 665 GE

[56] References Cited

U.S. PATENT DOCUMENTS

| | | | |
|---|---|---|---|
| 3,372,647 | 3/1968 | Kling | 417/362 |
| 4,015,915 | 4/1977 | Harpman | 417/490 |
| 4,084,924 | 4/1978 | Ivanoff et al. | 417/424 |
| 4,270,410 | 6/1981 | Herscovici | 74/572 |
| 4,325,678 | 4/1982 | Kanamaru et al. | 417/362 |
| 4,741,676 | 5/1988 | Janes | 417/362 |
| 4,825,659 | 5/1989 | Haydts | 60/413 |
| 5,082,428 | 1/1992 | Okletas et al. | 417/362 |
| 5,239,886 | 8/1993 | Uchring | 74/572 |

FOREIGN PATENT DOCUMENTS 3216563  1/1984  Germany.

OTHER PUBLICATIONS

Patent Abstracts of Japan, vol. 5, No. 190, JP-A-56-111594, Dec. 1981.

*Primary Examiner*—Peter Korytnyk
*Attorney, Agent, or Firm*—Wolf, Greenfield & Sacks, P.C.

[57] ABSTRACT

A device is provided for feeding pressurized liquid to a hydraulic circuit of a hydraulic actuation element. The device includes a motor, a flywheel and a positive displacement pump. The positive displacement pump and the flywheel are mounted on a common shaft. The device also includes a flywheel containment structure suitable for retaining the flywheel in the event of accidental breakage, and a motion transmission element. The containment structure rigidly supports a pair of seats for shaft bearings, and a seat for the pump.

18 Claims, 5 Drawing Sheets

DEVICE FOR FEEDING PRESSURIZED LIQUID TO A HYDRAULIC CIRCUIT

This application is a 371 of PCT/EP92/01224, Jun. 02, 1992.

BACKGROUND OF THE INVENTION

1. Field of the Invention

The present invention relates to a device for feeding pressurized liquid to a hydraulic circuit of a machine which comprises a hydraulic actuation element. For the description of a machine which comprises a hydraulic actuation element and a hydraulic circuit suitable for being fed by the device according to the invention, reference is made to the hydraulic press described in the PCT patent application no. PCT/EP 89/00610. The term "liquid" is used herein to generally refer to hydraulic oil, emulsions thereof, or to other liquids suitable for being used in hydraulic circuits for the actuation of hydraulic actuation elements.

The field of the present invention relates to devices which comprise a motor, a flywheel mounted on a shaft, a positive-displacement pump mounted on said shaft, a flywheel containment and supporting structure, and a motion transmission element suitable for transmitting the motion from said motor to said shaft.

The positive-displacement pump generally operates at rather high pressures, in excess of 100 bar, often higher than 200 bar, with peaks of over 300 bar. The momentary power transmitted from the flywheel to the pump is very high, up to 300–400 kw.

The above is in summary the main field of industrial use of the invention, but does not constitute a limitation of the scope thereof, since the device according to the invention, in particular as hereinafter described and claimed, can be advantageously used in any other equivalent field in which it is necessary to feed pressurized liquid, at a variable pressure during the working cycle, and in particular when it is necessary to transmit an extremely high momentary power.

2. Description of the Prior Art

Devices of this type are known and are described for example in the PCT patent no. PCT/EP 89/00610 in the name of the same Applicant, wherein the shaft on which the Dump and the flywheel are mounted is the motor shaft and said shaft is supported by the internal bearings of the motor.

Said known devices, however, entail some problems, since it is obviously impossible to mount more than one pump for each flywheel, and the containment of all the kinetic energy stored in the flywheel is entrusted exclusively to the bearings of the motor, which have not been designed for this purpose. It is furthermore difficult to try to mount further additional bearings, due to problems of coaxiality with the motor shaft. In view of the fact that the flywheel rotates at approximately 1800 rpm for these applications, it can be easily predicted that safety problems arise, especially in cases in which large flywheels are required. A vault-shaped structure, arranged over the flywheel, in order to protect the surrounding area, is in fact generally provided due to safety problems.

Japanese patent applications JP-A-56-111593 and JP-A-56-111594 describe a supporting structure of a flywheel connected with a pump group by an electromagnetic clutch.

This arrangement gives rise to some problems: an electromagnetic clutch can only transmit a limited power and is a complex device which can easily break under heavy loads; furthermore some of the energy generated by the flywheel is lost and is converted into heat for the friction inside the clutch. It is impossible to use standard pumps, since the described twin pumps require a special manufacture. The centering of the seats of the pump and of the bearings of the flywheel is complex and requires a long and expensive working process.

U.S. Pat. No. 3,756,751 describes a clutch housing in which a hydraulic pump is connected with a flywheel by gears. This solution cannot of course transmit high momentary power, since only the power sustained by the gears can be transmitted.

Canadian patent No 1144784 describes some housings for flywheels, but does not disclose anything about the connection with a pump.

SUMMARY OF THE INVENTION

The aim of the present invention is therefore to overcome the above disadvantages by providing a very compact device which can transmit safely very high momentary power.

Another aim of the invention is to be able to determine the motion transmission ratio between the motor and the shaft, so as to be able to maximally exploit the characteristics of the pump and of the flywheel.

Another aim of the invention is to be able to mount larger and faster flywheels while providing the fullest safety for the surrounding area and people.

Another aim of the invention is to ensure complete modularity in industrial production, so that in order to replace the pump with another one, even with a different model, it is sufficient to change the supporting flange of the pump. The same device is therefore suitable for a plurality of machines of different sizes, for each of which it is sufficient to adopt a specific type of pump and a specific flywheel thickness, without having to provide different devices for each type of machine.

Another aim of the invention is to be able to mount two standard pumps coupled to the same flywheel and also to allow said two pumps to be very close to one another and thus be easy to hydraulically couple. It is in fact very important for the pumps to be close to one another, due to the problems related to the compressibility of hydraulic oil and to the expandability of the connecting pipes. In order to achieve high speeds, the volume of the oil to be compressed and the volume generated by the expansion of the pipes must in fact be minimal. This can be achieved only if the pumps are very close to one another and therefore the length of the connecting pipes is minimal. This object is particularly difficult to achieve with standard pumps, since through-shaft pumps, which allow a close connection of the pumps themselves, are not usually available for the high pressures at which the devices according to the field of the present invention operate.

Another aim of the invention is that of providing a device which is virtually maintenance free.

And a further object of the invention is to provide a control unit which has very small overall dimensions and a modest overall cost.

This aim, these objects and others are achieved according to a first aspect of the invention by a device for feeding pressurized liquid to a hydraulic circuit, said device being of the type having: a motor, a flywheel mounted on a flywheel shaft, a positive-displacement pump having a pump shaft mounted on said flywheel shaft with a coupling which prevents any possible rotation between said flywheel shaft and said pump shaft, a containment and supporting structure for said flywheel and a motion transmission element suitable for transmitting the motion from said motor to said flywheel shaft: an axis of said flywheel shaft and an axis of said pump shaft being exactly the same; said structure rigidly supporting: a first seat for supporting a first bearing of said flywheel shaft, a second seat for supporting said pump.

A second aspect of the invention provides a device for feeding pressurized liquid to a hydraulic circuit, said device being of the type having: a motor, a flywheel mounted on a flywheel shaft, a positive-displacement pump having a pump shaft mounted on said flywheel shaft, a containment and supporting structure for said flywheel and a motion transmission element suitable for transmitting the motion from said motor to said flywheel shaft; an axis of said flywheel shaft and an axis of said pump shaft being the same; said structure rigidly supporting:

a) a first seat for supporting a first bearing of said flywheel shaft, and b) a supporting member which supports both a pump seat for supporting said pump and a third seat for supporting a second bearing of said flywheel shaft.

A third aspect of the invention provides a device for feeding pressurized liquid to a hydraulic circuit, said device being of the type having: a motor, a flywheel mounted on a flywheel shaft, a positive-displacement pump having a pump shaft mounted on said flywheel shaft, a containment and supporting structure for said flywheel and a motion transmission element suitable for transmitting the motion from said motor to said flywheel shaft; an axis of said flywheel shaft and an axis of said pump shaft being the same: said structure rigidly supporting: a first seat for supporting a first bearing of said flywheel shaft, a second seat for supporting said pump, a third seat for supporting a second bearing of said flywheel shaft, and lifting means for lifting said flywheel with respect to a position identified by said bearings.

A fourth aspect of the invention provides a process for manufacturing a device for feeding pressurized liquid to a hydraulic circuit, said device being of the type having: a motor, a flywheel mounted on a shaft, a positive-displacement pump mounted concentrically on said shaft, a containment and supporting structure for said flywheel and a motion transmission element suitable for transmitting the motion from said motor to said shaft: said structure rigidly supporting: a first seat for supporting a first bearing of said shaft, a second seat for supporting said pump: said process comprising a step in which during the working of sa;,l first seat and of said second seat on a machine tool, said structure is maintained in the same working position on said machine-tool.

Said containment structure preferably rigidly supports a fourth seat for supporting a second pump mounted on another end of-said flywheel shaft. In this manner it is possible to easily couple two standard pumps to the same flywheel.

The flywheel preferably has a diameter comprised between 30 and 100 cm and more preferably comprised between 50 and 76 cm.

The invention furthermore relates to a machine and in particular to a hydraulic press which comprises a hydraulic actuation element and a hydraulic circuit fed by a device according to the invention. For whatever is required for the description of a hydraulic press suitable for being fed by the device according to the invention, reference is made the description of the hydraulic press provided in the patent application PCT/EP 89/00610.

BRIEF DESCRIPTION OF THE DRAWINGS

Further characteristics and advantages of the invention will become apparent from the description of two preferred but not exclusive embodiments of the device, illustrated only by way of non-limitative example in the accompanying drawings, wherein.

DESCRIPTION OF THE PREFERRED EMBODIMENTS

Figure 1:
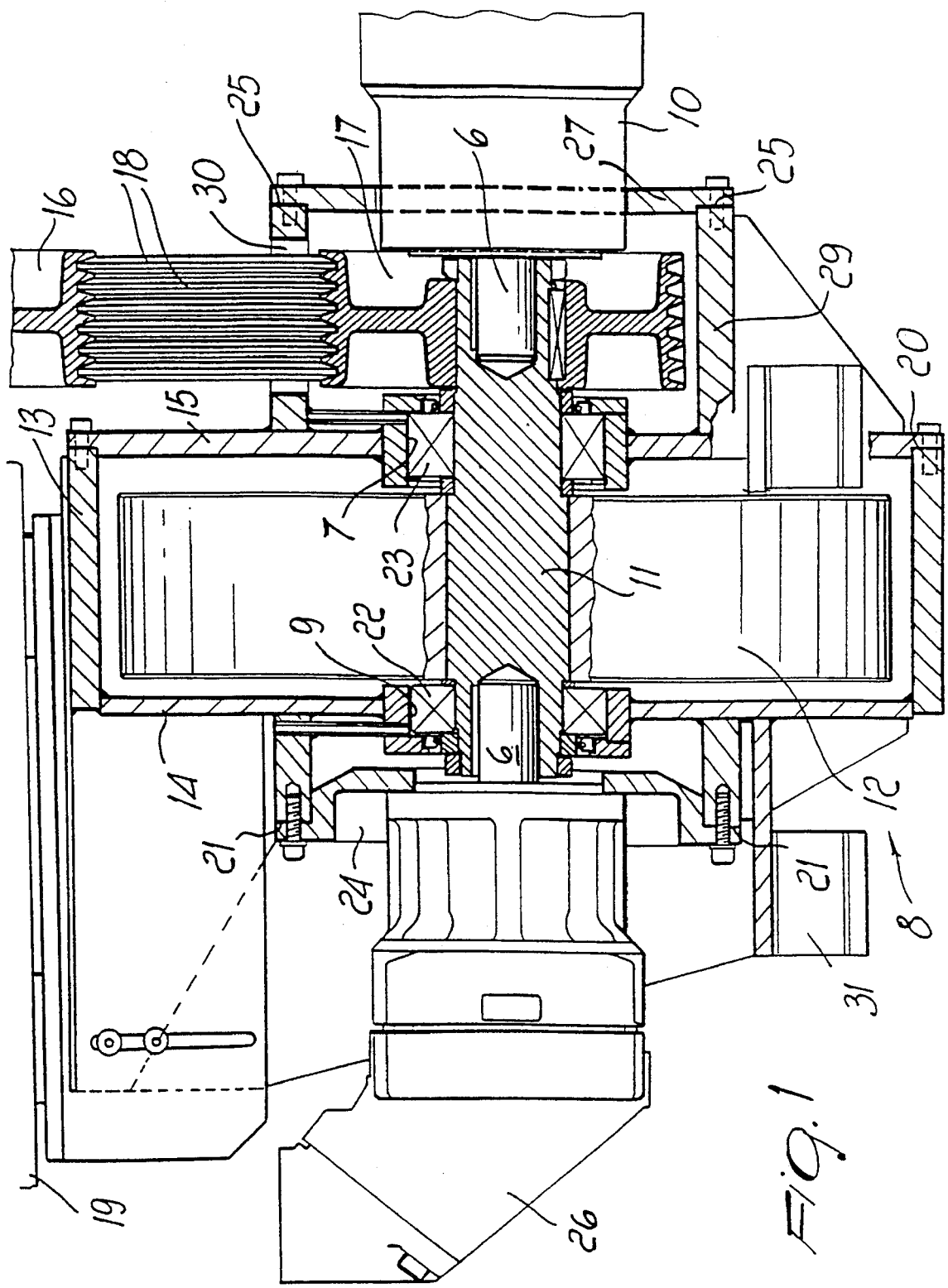
FIG. 1 is a partially sectional side view of a first embodiment of the device according to the invention.

With reference to FIGS. 1 to 6, the positive-displacement pump 10 is mounted on a shaft 11, on which a flywheel 12 is also mounted. A containment and supporting structure 8 of the flywheel 12 has a thickness which is sufficient to retain said flywheel 12 in case of any accidental breakage, since it contains said flywheel completely. A motor 19 transmits its own motion to the shaft 11 by means of a motion transmission element 16, 17 and 18. Said motion transmission element has a presettable transmission ratio, and is constituted in particular by the first pulley 17, which is keyed on the flywheel shaft 11, and by the second pulley 16, which is keyed on the motor 19. The pulleys 16 and 17 are connected by means of the belts 18. The transmission ratio between the motor 19 and the shaft 11 can be preset by means of the diameter of the pulleys 16 and 17: by changing the relative diameter of said pulleys it is possible to vary the transmission ratio. The first pulley 17 is arranged between the flywheel 12 and the pump 10. Particularly, according to FIG. 1, the first pulley 17 is arranged between a second bearing 23 and the pump 10.

The containment and supporting structure 8 rigidly supports a first seat 9 for supporting a first bearing 22 of the flywheel, a second seat 20 for supporting the second bearing 22 of the flywheel shaft 11. The second seat 20 supports also the pump 10. Particularly there is provided a supporting member 15 which is arranged on the second seat 20 and which supports a third seat 7 for tile second bearing 23 and a pump seat 25.

The containment structure 8 rigidly supports a fourth seat 21 for a second positive-displacement pump 26 which is mounted on the other end of the flywheel shaft 11.

Figure 6:
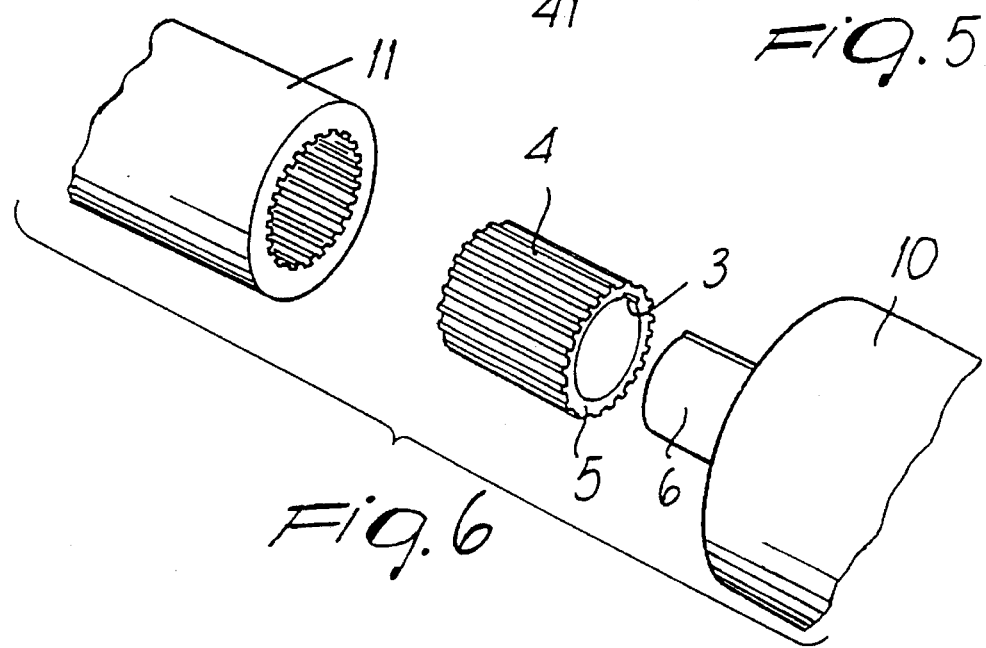
FIG. 6 is a perspective exploded view of the coupling between pump shaft and flywheel shaft.

With particular reference to FIG. 6, the pump 10 has a pump shaft 6 which is mounted on the flywheel shaft 11 with a coupling which prevents any possible rotation between the flywheel shaft 11 and the pump shaft 6. This is achieved by a connecting body 5 which is arranged and splined inside the flywheel shaft 11 and outside said pump shaft 6. Particularly the connecting body 5 comprises outer connecting means 4 and inner connecting means 3 which comprise splines for engaging respectively complementary splines provided inside said flywheel shaft 11 and a key provided on the pump shaft 6. According to this solution, the connecting body 5 allows a full modularity, because the same flywheel shaft can be used and it can be adapted to each pump shaft by simply changing the connecting body 5.

Figure 2:
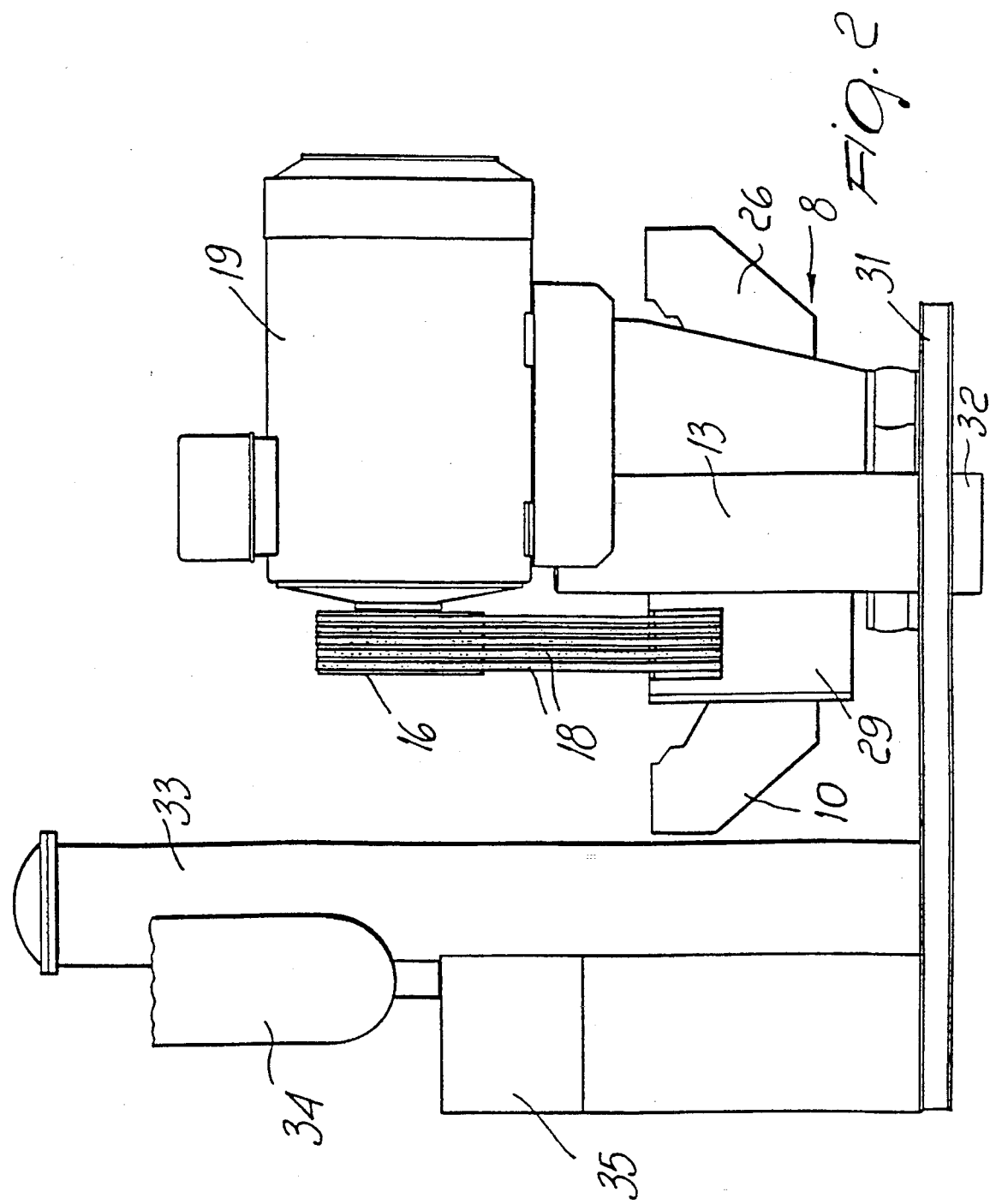
FIG. 2 is a side view of the device according to the invention, taken on the side opposite to the one of FIG. 1.
Figure 3:
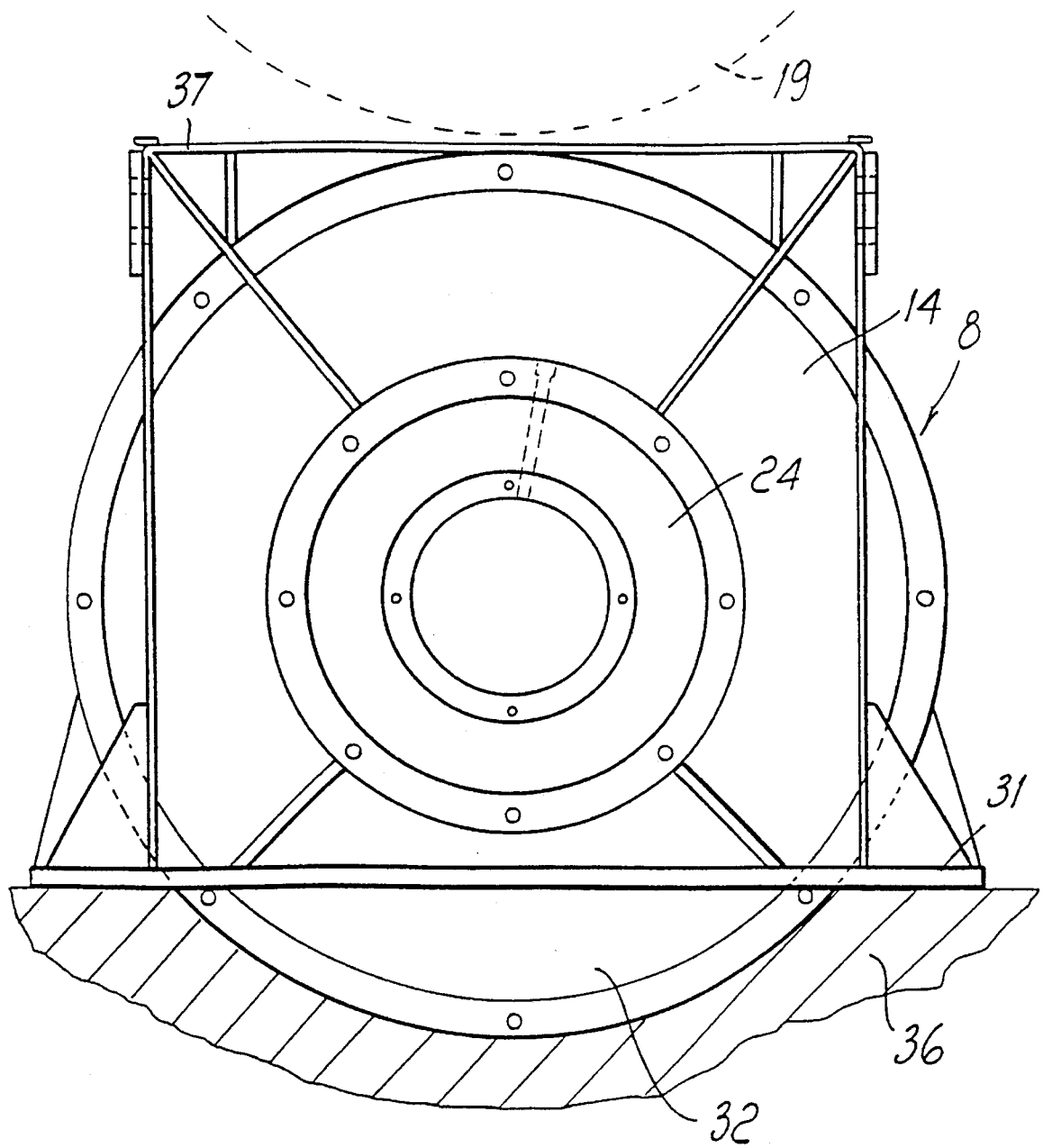
FIG. 3 is a partially sectional front view of the first embodiment of the device according to the invention.

With particular reference to FIGS. 1–3 and to the first embodiment of the invention, the pump 10 is supported in seat 25 by means of a flange 27. The second pump 26 is mounted on the other end of the flywheel shaft. 11 and particularly on the flange 24.

The motor 19 is preferably supported by the containment structure 13, 14 and 15, and in its preferred embodiment is arranged directly above the containment structure.

The structure 8 has the shape of a hollow cylinder 13 provided with two covers 14 and 15; the first cover 14 supports the first seat 9 of the first bearing 22 of the shaft 11 and the fourth seat 21 for the pump 26, by means of the flange 24. The second cover 15 is arranged on the second seat 20 and supports the second bearing 23 and the pump seat 25 for the pump 10.

With a particularly compact solution, the second cover 15 supports a seat 29 for containing the motion transmission element 16, 17 and 18, and in particular the pulley 17, so as to allow the exit of the belts 18 through the opening 30. The pump seat 21 for the pump 26 is defined on said cover 14.

Preferably, for a greater stability of the entire structure, and for an even more compact execution, the containment structure 8 is supported on a base 31 and protrudes below said base with the part 32.

Figure 5:
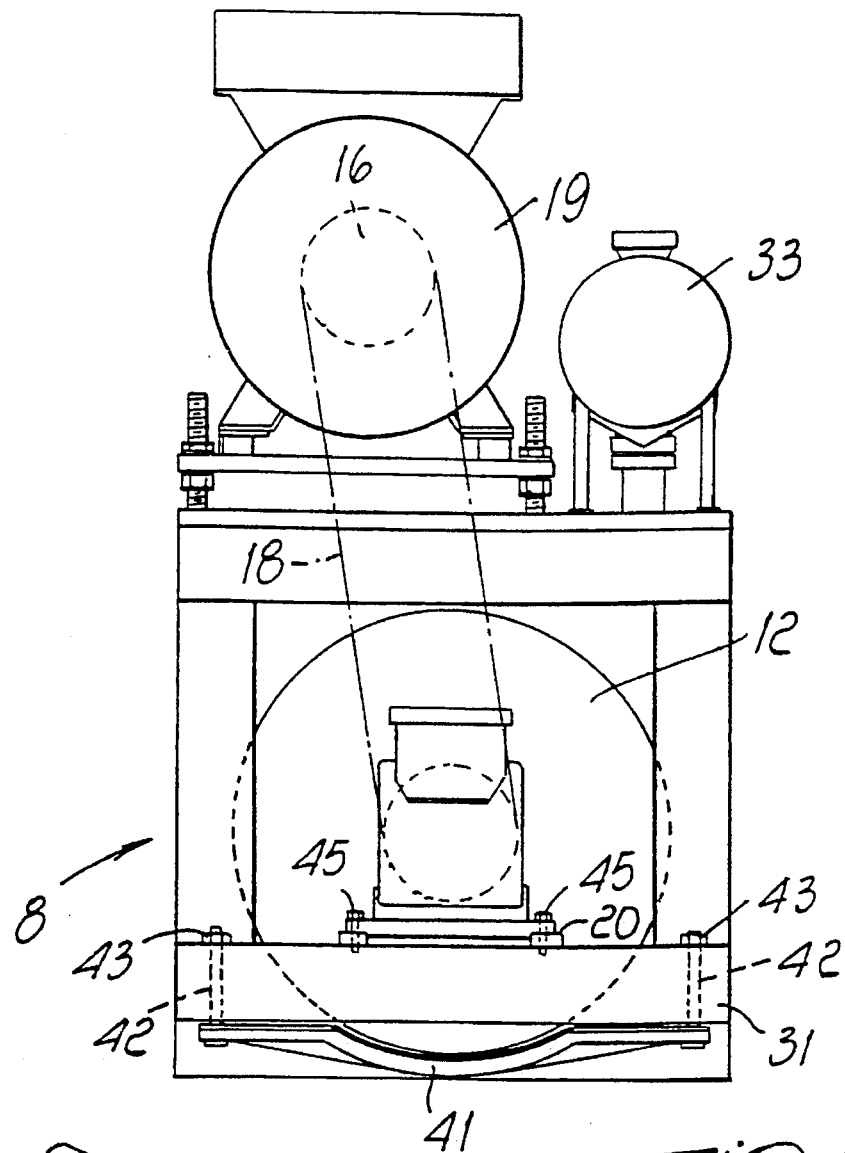
FIG. 5 is a partially sectional front view of the second embodiment of the device according to the invention.

With particular reference to FIG. 2 and 5; a general view of the device mounted on the base 31 is shown. The heat exchanger 33, the accumulator 34 and the oleodynamic block 35 are mounted on the same base 31 for greater compactness. For the operation of said elements 33, 34 and 35, reference is made to application no. PCT/EP 89/00610.

With particular reference to FIG. 3, it is shown the part 32 of the containment structure protruding below the base 31 so as to be arranged in an adapted pit formed in the floor 36. In the upper part, the containment structure 13, 14 and 15 is supported by a system of ridges 37 which also support the motor 19. In particular the flange 24, on which the pump has not been mounted yet, is visible.

Figure 4:
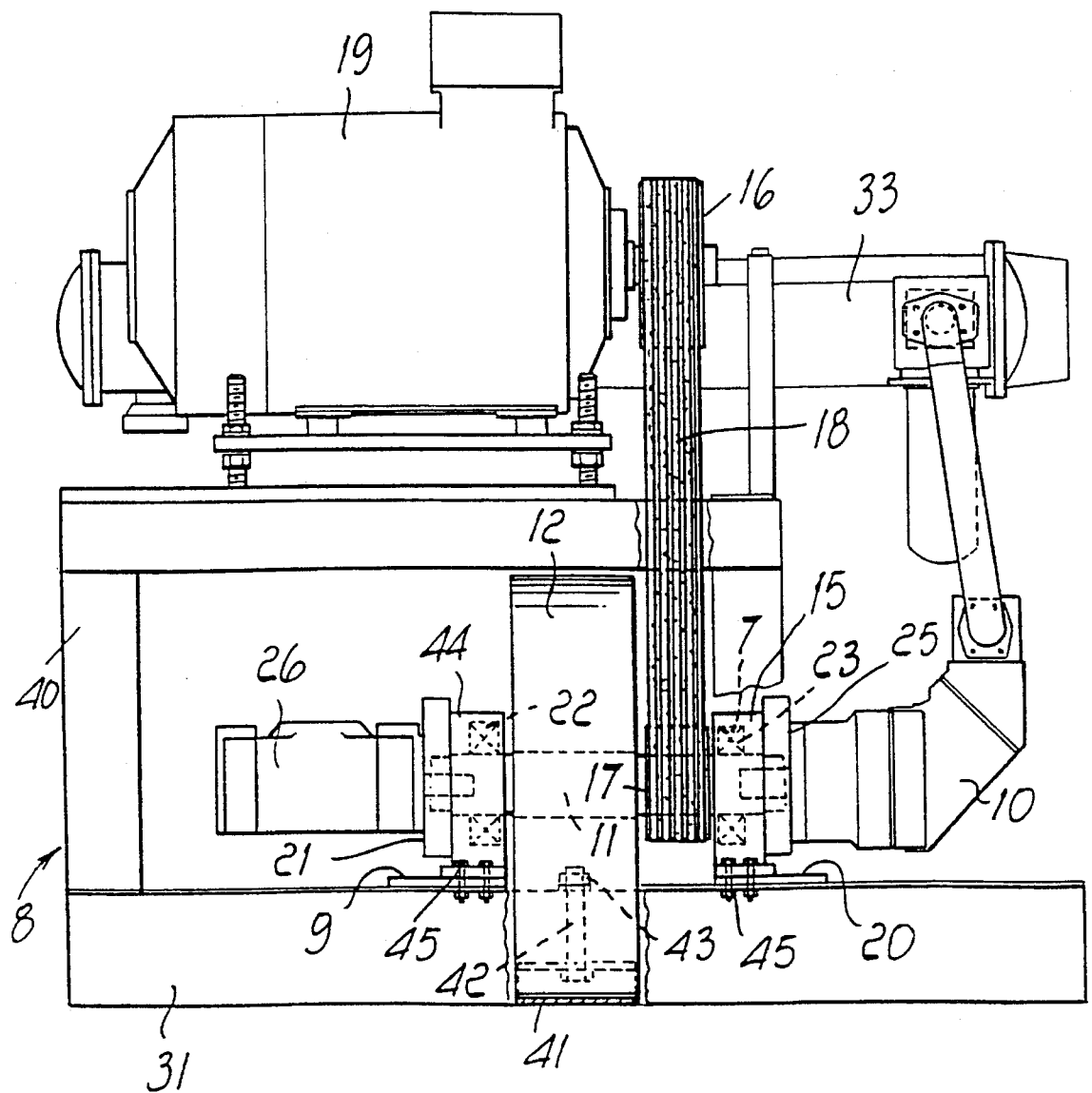
FIG. 4 is a partially sectional side view of a second embodiment of the device according to the invention.

With particular reference to FIGS. 4–6, and to the second preferred embodiment of the invention, the containment and supporting structure 8 comprises a base 31 which is rigidly connected with uprights 40. A part of the flywheel 12 is arranged inside the base 31. Lifting means 41 are provided for lifting the flywheel 12 with respect to the position identified by the bearings 22 and 23. Particularly, the lifting means 41 comprise tie members 42 which lift the flywheel tightening the bolts 43, if bolts 45 are removed. The lifting means 41 allow an easy assembly and disassembly of the flywheel, of the pumps and of the bearings.

A supporting member 44 is arranged on the first seat 9 so that it can slide on it except when the bolts 45 are tightened. The supporting member 44 supports the first bearing 22 and the fourth seat 21 for the pump 26.

A supporting member 15 is arranged on the second seat 20 so that it can slide on it except when the bolts 45 are tightened. The supporting member 15 supports the third seat 7 for the second bearing 23 and the pump seat 25 for the pump 10.

The sliding of the supporting members 15 and 44 allow an easy assembly and disassembly of the flywheel, of the pumps and of the bearings, maintaining a perfect centering during the sliding.

The first pulley 17 is arranged between the flywheel 12 and a second bearing 23 of the flywheel shaft 11.

Both the first and the second embodiment of the invention can be manufactured according to the claimed process, and particularly, during the working of the first seat 9 and of the second seat 20 the containment and supporting structure 8 is maintained in the same working position on a machine-tool. so as to ensure a perfect centering and linearity of the seats and allow full coaxiality between the pumps and the flywheel.

The invention is susceptible to numerous modifications and variations, all of which are within the scope of the same inventive concept; in particular, the motion transmission element can be for example replaced with a pair of gears, coupled directly or by means of a chain, with a result which is less convenient but sufficient for several uses. Similarly, the various elements may be replaced with other mechanically equivalent ones.

What is claimed is:

1. A device for feeding pressurized liquid to a hydraulic circuit, said device comprising: a motor, a flywheel mounted on a flywheel shaft, a positive-displacement pump having a pump shaft mounted on said flywheel shaft with a coupling which prevents any possible rotation between said flywheel shaft and said pump shaft, a containment and supporting structure for said flywheel and a motion transmission element suitable for transmitting motion from said motor to said flywheel shaft; an axis of said flywheel shaft and an axis of said pump shaft being exactly the same; said structure rigidly supporting: a first seat for supporting a first bearing of said flywheel shaft, a second seat for supporting said pump, and a supporting member which supports both a pump seat for supporting said pump and a third seat for supporting a second bearing of said flywheel shaft.

2. The device according to claim 1 in which said structure rigidly supports lifting means for lifting said flywheel with respect to a position identified by said bearings.

3. The device according to claim 1 in which said structure rigidly supports a fourth seat for supporting a second pump mounted on another end of said flywheel shaft.

4. The device according to claim 1, in which said motion transmission element comprises a belt, a first pulley keyed on said flywheel shaft, and a second pulley keyed on said motor; said first pulley being arranged between said flywheel and said pump.

5. The device according to claim 4 in which said first pulley is arranged between said flywheel and said second bearing of said flywheel shaft.

6. The device according to claim 4, in which said first pulley is arranged between said second bearing of said flywheel shaft and said pump.

7. The device according to claim 1, in which said first seat supports said first bearing by a supporting member which can slide on said first seat, except when the supporting member is tightened.

8. The device according to claim 1, in which said second seat supports said pump by a supporting member which can slide on said second seat, except when the supporting member is tightened.

9. The device according to claim 1, in which said structure has the shape of a hollow cylinder provided with two covers, a first cover for supporting said first seat, and a second cover for supporting said pump, said structure rigidly supporting a fourth seat for supporting a second pump mounted on another end of said flywheel shaft.

10. The device according to claim 9, characterized in that said first cover supports said fourth seat.

11. The device according to claim 9, characterized in that one of said covers supports a seat for said motion transmission element.

12. The device according to claim 1 in which said structure has a base, and wherein a part of said flywheel is arranged inside said base.

13. The device according to claim 1, in which said flywheel has a diameter between approximately 30 cm and 100 cm.

14. The device according to claim 1 in which said flywheel has a diameter between approximately 50 cm and 76 cm.

15. A device for feeding pressurized liquid to a hydraulic circuit, said device comprising:

a motor;

a flywheel mounted on a flywheel shaft;

a positive displacement pump having a pump shaft;

a motion transmission element to transmit motion from said motor to said flywheel shaft;.

a support structure for said flywheel, said support structure rigidly supporting a first seat which supports a first bearing of said flywheel shaft, and a second seat which supports said pump; and a connecting body coupling said pump shaft to said flywheel shaft along an identical axis, said connecting body preventing any possible rotation between said flywheel shaft and said pump shaft, said connecting body including outer connecting means for engaging an inner portion of said flywheel shaft, and inner connecting means for engaging an outer portion of said pump shaft.

16. The device according to claim 15 in which said outer connecting means includes a plurality of splines, and said flywheel shaft includes a plurality of corresponding splines to engage said plurality of splines.

17. The device according to claim 15 in which said inner connecting means includes a splines, and said pump shaft includes a key to engage said spline.

18. An apparatus comprising:

a hydraulic actuation element;

a hydraulic circuit; and a device for feeding pressurized liquid to said hydraulic circuit to actuate said hydraulic actuation element, said device including:

a motor;

a flywheel mounted on a flywheel shaft;

a positive displacement pump having a pump shaft coupled to said flywheel shaft along an identical axis;

a motion transmission element to transmit motion from said motor to said flywheel shaft; and a containment and supporting structure for said flywheel, said structure rigidly supporting a first seat which supports a first bearing of said flywheel, a second seat for supporting said pump, and a supporting member which support both a pump seat for supporting said pump and a third seat for supporting a second bearing of said flywheel shaft.

\* \* \* \* \*